United States Patent
Moom

(10) Patent No.: US 8,852,790 B2
(45) Date of Patent: Oct. 7, 2014

(54) SECONDARY BATTERY WITH PROTECTION CIRCUIT MODULE

(75) Inventor: Daeyon Moom, Yongin-si (KR)

(73) Assignee: Samsung SDI Co., Ltd., Gyeonggi-do (KR)

(*) Notice: Subject to any disclaimer, the term of this patent is extended or adjusted under 35 U.S.C. 154(b) by 714 days.

(21) Appl. No.: 12/646,190

(22) Filed: Dec. 23, 2009

(65) Prior Publication Data

US 2010/0178549 A1    Jul. 15, 2010

(30) Foreign Application Priority Data

Jan. 9, 2009    (KR) .................. 10-2009-0001870

(51) Int. Cl.
 *H01M 2/24* (2006.01)
 *H01M 2/02* (2006.01)
 *H01M 10/42* (2006.01)
 *H01M 2/20* (2006.01)

(52) U.S. Cl.
 CPC ............ *H01M 2/202* (2013.01); *H01M 10/425* (2013.01); *Y02E 60/12* (2013.01)
 USPC ......................................... 429/158; 429/178

(58) Field of Classification Search
 CPC combination set(s) only.
 See application file for complete search history.

(56) References Cited

U.S. PATENT DOCUMENTS

| 2004/0197642 A1 | 10/2004 | Sato |
| 2006/0032667 A1 | 2/2006 | Sato |

FOREIGN PATENT DOCUMENTS

| JP | 04002041 A | * | 1/1992 |
| JP | 2008288077 A | * | 11/2008 |
| KR | 10-2004-0086796 A | | 10/2004 |
| KR | 10-2005-0099505 A | | 10/2005 |
| KR | 10-2007-33834 A | | 3/2007 |
| KR | 2007-33834 A | * | 3/2007 |
| KR | 10-2007-0065560 A | | 6/2007 |
| KR | 10-2007-0068847 A | | 7/2007 |

OTHER PUBLICATIONS

Korean Notice of Allowance dated Feb. 15, 2011 for Korean Patent Application No. KR 10-2009-0001870 which corresponds to the captioned application.
Korean Office Action dated Aug. 12, 2010 in Korean Patent Application No. 10-2009-0001870 filed Jan. 9, 2009.

* cited by examiner

*Primary Examiner* — Ula C Ruddock
*Assistant Examiner* — Daniel Gatewood
(74) *Attorney, Agent, or Firm* — Knobbe, Martens, Olson & Bear, LLP

(57) ABSTRACT

A secondary battery including: a cell unit including at least one battery cell; a protection circuit module including a circuit board having at least one terminal hole and at least one electrode tab. The electrode tab includes an insertion plate that is inserted into the terminal hole, to electrically connect the cell unit and the circuit board. The insertion plate includes a locking wing.

17 Claims, 4 Drawing Sheets

SECONDARY BATTERY WITH PROTECTION CIRCUIT MODULE

CROSS-REFERENCE TO RELATED APPLICATIONS

This application claims the benefit of Korean Application No. 10-2009-0001870, filed Jan. 9, 2009, in the Korean Intellectual Property Office, the disclosure of which is incorporated herein by reference.

BACKGROUND OF THE INVENTION

1. Field of the Invention

Aspects of the present invention relate to a secondary battery including a protection circuit module.

2. Description of the Related Art

In recent years, due to the rapid development of the electronics, communications, and computer industries, portable electronic devices are being widely distributed. Secondary batteries are being used as power sources of portable electronic devices.

Currently, pack-type secondary batteries are being widely used. A pack-type battery integrates a bare cell that provides electric energy and a protection circuit module (PCM) that controls the charging and discharging of the bare cell. The protection circuit module includes a circuit board to which various circuit devices are mounted.

Currently, the PCM and the bare cell are electrically connected to each other by various methods, in accordance with the shape and intended use of a secondary battery. One method of electrically connecting the PCM to the bare cell includes soldering an electrode tab that is electrically connected to a positive electrode, or a negative electrode, of the bare cell, to the PCM, after the electrode tab is inserted into a terminal hole formed in a circuit board of the PCM. However, in this method the electrode tab is easily displaced from the terminal hole during the coupling, such that workability deteriorates, in that the electrode tab may be soldered at a deviated position, and the circuit board may be bent.

SUMMARY OF THE INVENTION

Aspects of the present invention provide a secondary battery including a protection circuit module exhibiting excellent workability, when a circuit board of the protection circuit module and a bare cell of the battery are coupled together.

Aspects of the present invention also provide a secondary battery including a protection circuit module that is maintained in a correct position, when connected to a bare cell.

In accordance with an exemplary embodiment of the present invention, there is provided a secondary battery, comprising: a cell unit including at least one battery cell; a protection circuit module including a circuit board having at least one terminal hole; and at least one electrode tab including an insertion plate that is inserted into the terminal hole, to electrically connect the cell unit and the circuit board. The insertion plate includes a locking wing.

According to aspects of the present invention, the insertion plate comprises a base plate, and the locking wing is bent from the base plate, at an angle. The locking wing is formed by cutting and bending part of the base plate. The locking wing may comprise two locking wings that are bent in opposing directions.

According to aspects of the present invention, the electrode tab is made of nickel. The electrode tab further comprises a locking plate, with the circuit board interposed therebetween and the locking wing and the locking plate. The electrode tab is formed by bending a plate member.

According to aspects of the present invention, the insertion plate and the circuit board are soldered together. The insertion plate has a passing hole that is filled with solder, during the soldering. In this case, the insertion plate comprises a base plate, and the passing hole is formed by cutting and bending the locking wing away from the base plate.

According to aspects of the present invention, the locking wing is elastically bent during insertion into a terminal hole formed in the circuit board. Once through the terminal hole, the locking wing returns to its original shape, to lock the insertion plate in the terminal hole.

According to aspects of the present invention, the cell unit comprises: a plurality of battery cells; and at least one connection plate electrically connecting the battery cells. An electrode tab is electrically connected to the connection plate. In this case, the electrode tab and the connection plate are integrated together, and the electrode tab and the connection plate are formed by bending a plate member.

According to aspects of the present invention, since a locking wing locks the electrode tab in the terminal hole is provided, workability improves, and the PCM is held in the correct position with respect to the bare cell.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the exemplary embodiments, taken in conjunction with the accompanying drawings, of which.

DETAILED DESCRIPTION OF THE EXEMPLARY EMBODIMENTS

Figure 1:
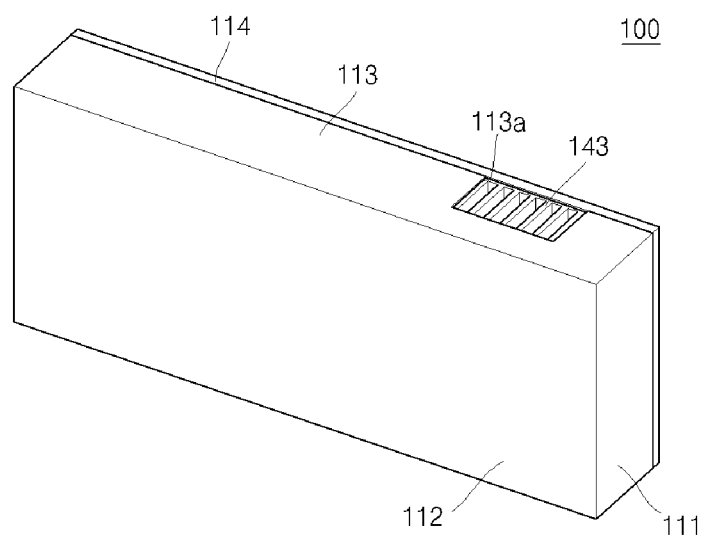
FIG. 1 is a perspective view illustrating a secondary battery, according to an exemplary embodiment of the present invention.

Reference will now be made in detail to the exemplary embodiments of the present invention, examples of which are illustrated in the accompanying drawings, wherein like reference numerals refer to the like elements throughout. The exemplary embodiments are described below, in order to explain the aspects of the present invention, by referring to the figures.

FIG. 1 is a perspective view illustrating a secondary battery, according to an embodiment of the present invention.

Figure 2:
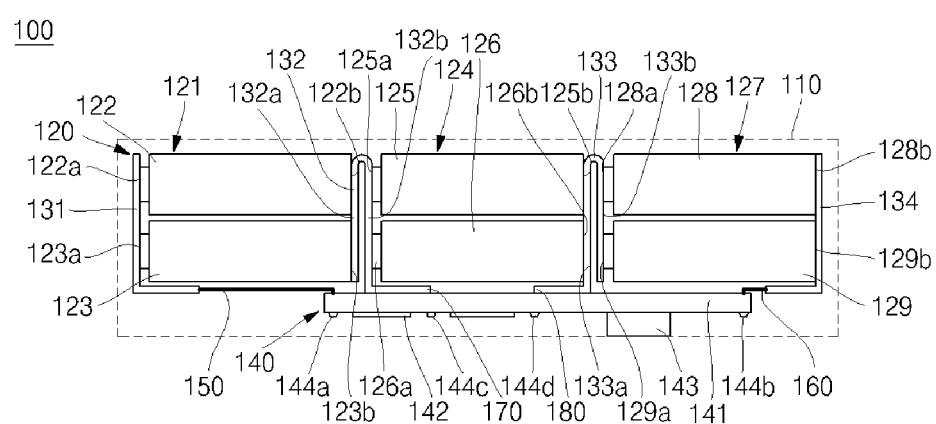
FIG. 2 is a plan view illustrating the secondary battery of FIG. 1, without an external case.
Figure 3:
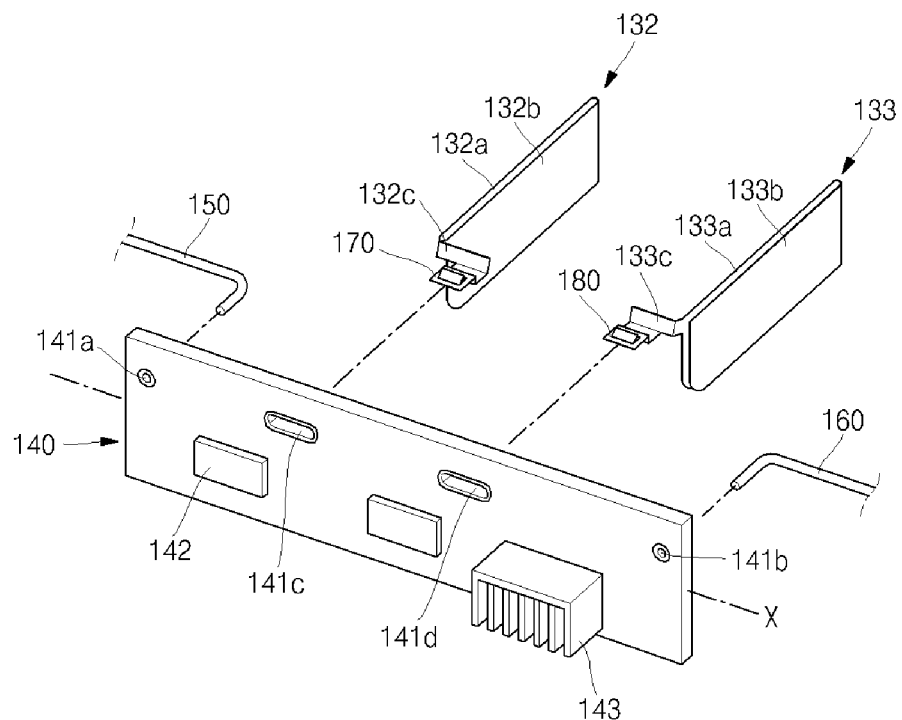
FIG. 3 is an exploded perspective view illustrating a protection circuit module of FIG. 2, in which electrode tabs and wires are separated from each other.
Figure 4:
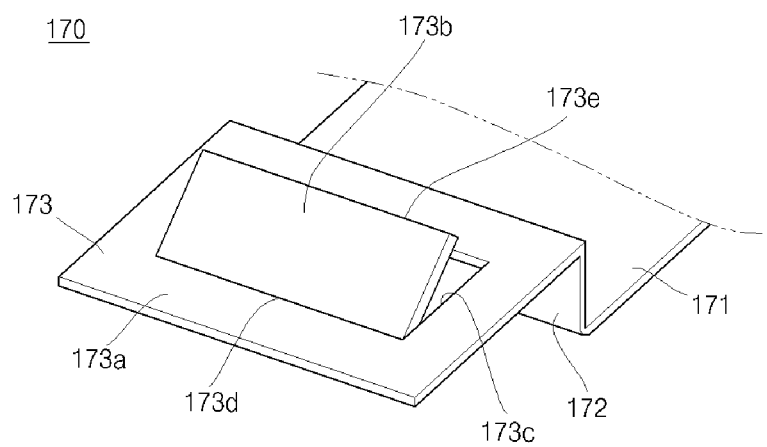
FIG. 4 is a perspective view illustrating an electrode tab of FIG. 3.
Figure 5:
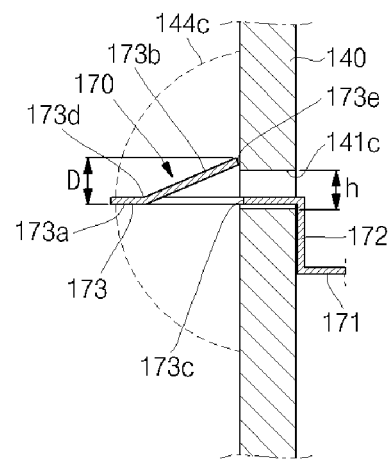
FIG. 5 is a sectional view illustrating the region to which the electrode tab is coupled to the protection circuit module of FIG. 2.

FIG. 2 is a plan view illustrating the secondary battery of FIG. 1, excluding an external case. FIG. 3 is an exploded perspective view illustrating a protection circuit module of FIG. 2, in which electrode tabs and wires are separated from each other. FIG. 4 is a perspective view illustrating the electrode tab of FIG. 3. FIG. 5 is a sectional view illustrating the region where the electrode tab is coupled to the protection circuit module of FIG. 2. Referring to FIGS. 1 to 5, a secondary battery 100, according to an embodiment of the present invention, includes an external case 110, a cell unit 120, a protection circuit module (PCM) 140, first and second connection wires 150 and 160, and first and second electrode tabs 170 and 180.

The external case 110 includes an accommodating member 111 and a cover 114. The external case 110 encloses and protects the cell unit 120, the PCM 140, the first and second connection wires 150 and 160, and the first and second electrode tabs 170 and 180. The accommodating member 111 includes a bottom plate 112 and a side wall 113 extending upward from the bottom plate 112. The accommodating member 111 houses the cell unit 120, the PCM 140, the first and second wires 150 and 160, and the first and second electrode tabs 170 and 180. An opening (not shown) of the accommodating member 111 is closed by the cover 114. An exposing hole 113a, through which a connector 143 connecting the secondary battery 100 to a portable electronic device (not shown) is exposed, is formed in the side wall 113 of the accommodating member 111.

The cell unit 120 includes first, second, and third cell modules 121, 124, and 127 that are serially connected to each other. The cell unit 120 supplies electric power to a connected portable electronic device (not shown). In the cell unit 120, the three cell modules 121, 124, and 127 are serially connected to each other, but the present invention is not limited thereto. The cell unit 120 may include, for example, one, two, four, or more cell modules, which are serially connected to each other.

The first cell module 121 includes a first battery cell 122 and a second battery cell 123 that are connected in parallel, but the present invention is not limited thereto. For example, the first cell module 121 may include any suitable number of battery cells that are connected in parallel. A rechargeable cylinder-type battery cell may be used as the first battery cell 122. However, the present invention is not limited thereto, as other types of battery cells, such as a prismatic-type battery cell, may be used. The first battery cell 122 includes a positive electrode 122a and an opposing negative electrode 122b. Since the configuration of the second battery cell 123 is the same as the configuration of the first battery cell 122, a detailed description thereof is omitted. Moreover, since the configuration of the second cell module 124 and the third cell module 127 are the same as the configuration of the first cell module 121, a detailed description thereof is omitted.

The positive electrodes 122a and 123a of the battery cells 122 and 123 are electrically connected to each other by a first connection plate 131. The first connection plate 131 is made of an electrically conductive material, such as nickel, and is coupled to the positive electrodes 122a and 123a of the battery cells 122 and 123, by spot welding, for example. The first connection wire 150 is electrically coupled to the first connection plate 131, by soldering, for example.

Negative electrodes 122b and 123b of the battery cells 122 and 123 are electrically connected to positive electrodes 125a and 126a of battery cells 125 and 126, of the second cell module 124, by a second connection plate 132. The second connection plate 132 includes first and second connection plates 132a and 132b (portions) that are folded so as to overlap. The negative electrodes 122b and 123b are coupled to the first connection plate 132a, by spot welding, for example. The positive electrodes 125a and 126a are coupled to the second connection plate 132b by spot welding, for example. The second connection plate 132 further includes an extension plate 132c that is bent from the second connection plate 132b. The first electrode tab 170 is connected to the extension plate 132c. A plate member, which is an electrically conductive material, such as nickel, is bent to form the first connection plate 132 and the first electrode tab 170, as a single body.

Negative electrodes 125b and 126b of the battery cells 125 and 126 are electrically connected to positive electrodes 128a and 129a of the battery cells 128 and 129, of the third cell module 127, by a third connection plate 133. The third connection plate 133 includes first and second connection plates 133a and 133b (portions) that are folded so as to overlap. The negative electrodes 125b and 126b are coupled to the first connection plate 133a, by spot welding, for example. Positive electrodes 128a and 129a of the battery cells 128 and 129 of the third cell module 127 are coupled to the second connection plate 133b by spot welding, for example. The third connection plate 133 further includes an extension plate 133c that is bent from the first connection plate 133a. A second electrode tab 180 is connected to an extension plate 133c. A plate member, which is an electrically conductive material, such as nickel, is bent to form the second connection plate 133 and the second electrode tab 180, as a single body.

Negative electrodes 128b and 129b of battery cells 128 and 129 are electrically connected by a fourth connection plate 134. The fourth connection plate 134 is made of an electrically conductive material, such as nickel, and is coupled to negative electrodes 128b and 129b, by spot welding, for example. The second connection wire 160 is electrically coupled to the fourth connection plate 134, by soldering, for example.

The PCM 140 includes a circuit board 141 and a plurality of electric circuit devices 142 mounted on the circuit board 141. The PCM 140 is electrically coupled to the cell unit 120 to control the operation of the secondary battery 100.

The circuit board 141 is a circuit board that includes a printed wiring line pattern (not shown) and is in the form of a thin plate that extends lengthwise along the X-axis. First, second, third, and fourth terminal holes 141a, 141b, 141c, and 141d, whose insides are plated with gold and are electrically connected to the printed wiring line pattern, are formed in the circuit board 141.

The first and second terminal holes 141a and 141b are generally circular through-holes. Ends of the first and second connection wires 150 and 160 are inserted into the first and second terminal holes 141a and 141b, respectively, by soldering 144a and 144b.

The third and fourth terminal holes 141c and 141d are slit-shaped and extend lengthwise along the X-axis of the circuit board 141. The first and second electrode tabs 170 and 180 are inserted into the third and fourth terminal holes 141c and 141d, respectively, to be soldered (144c and 144d).

The connector 143 is mounted on the circuit board 141. The connector 141 is exposed to the outside through the exposing hole 113a. The plurality of electric circuit devices 142 mounted on the circuit board 141 includes devices such as a control integrated circuit (IC), a charging and discharging switch, and the like.

The ends of the first connection wire 150 are soldered and electrically connected to the first connection plate 131 and the first terminal hole 141a. The ends of the second connection wire 160 are soldered and electrically connected to the fourth connection plate 134 and the second terminal hole 141b.

The first electrode tab 170 includes a connection plate 171, a locking plate 172, and an insertion plate 173. The first electrode tab 170 is inserted in and coupled to the third terminal hole 141c of the circuit board 141, to electrically connect the second connection plate 132 to the circuit board 141. The first electrode tab 170 is integrated with the second connection plate 132 and is formed by bending the plate member. The first electrode tab 170 and the second connection plate 132 are shown as being integrated with each other, but the present invention is not limited thereto. The first electrode tab 170 can be made of a different material than the second connection plate 132 and can be electrically connected to the second connection plate 132, for example, by wiring.

The connection plate 171 extends from the extension plate 132c of the second connection plate 132, toward the circuit board 141 of the PCM 140. The connection plate 171 maintains a proper distance between the cell unit 120 and the circuit board 141.

The locking plate 172 is bent from the connection plate 171 and faces the circuit board 141. The locking plate 172 prevents the circuit board 141 from moving excessively toward the cell unit 120.

The insertion plate 173 includes a base plate 173a that is bent from the locking plate 172, and a locking wing 173b that is bent from the base plate 173a. The insertion plate 173 is electrically coupled to the circuit board 141, by solder 144c. The locking wing 173b is separated from the base plate 173, so as to form a passing hole 173c. The passing hole 173c is filled with the solder 144c, such that the first electrode tab 170 and the circuit board 141 are firmly coupled together. The locking wing 173b is inclined with respect to the base plate 173a. The locking wing 173b is cut from the base plate 173a and then bent at a crease 173d. The free end 173e of the locking wing 173b contacts the circuit board 141, to prevent the first electrode tab 170 from deviating from the circuit board 141. The distance d, between the end 173e of the locking wing 173b and the base plate 173a, is greater than the height h of the third terminal hole 141c. When the insertion plate 173 is inserted into the third terminal hole 141c, the locking wing 173b is elastically depressed, such that the locking wing 173b can pass through the third terminal hole 141c. After the locking wing 173b passes through the third terminal hole 141c, the locking wing 173b returns to its original shape.

The second electrode tab 180 is similar to the first electrode tab 170, and is inserted into the third terminal hole 141d, to electrically connect the third connection plate 133 and the circuit board 141. Since the second electrode tab 180 is similar to the first electrode tab 170, a detailed description thereof is omitted.

The first and fourth connection plates 131 and 134 are electrically connected to the circuit board 141 of the PCM 140, by the first and second connection wires 150 and 160, but the present invention is not limited thereto. Those skilled in the art will appreciate that the first and fourth connection plates 131 and 134 can be electrically connected to the circuit board 141, by elements similar to the first and second electrode tabs 170 and 180.

Figure 6:
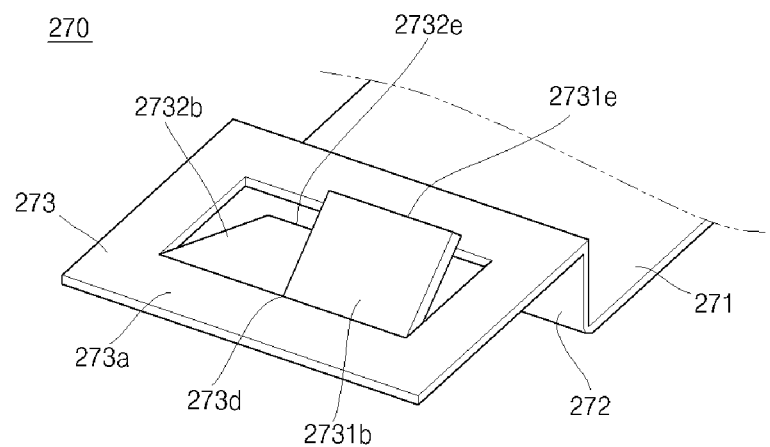
FIG. 6 is a perspective view illustrating an electrode tab of a secondary battery, according to another exemplary embodiment of the present invention.
Figure 7:
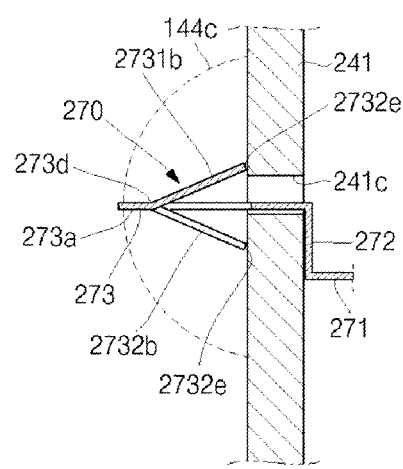
FIG. 7 is a sectional view illustrating the region to which the electrode tab of FIG. 6 is coupled to a protection circuit module.

FIG. 6 is a perspective view illustrating an electrode tab of a secondary battery, according to another exemplary embodiment of the present invention. FIG. 7 is a sectional view illustrating the coupling of the electrode tab FIG. 6 and a protection circuit module.

Referring to FIGS. 6 and 7, an electrode tab 270 includes a connection plate 271, a locking plate 272, and an insertion plate 273. The electrode tab 270 is inserted into, and coupled with, a terminal hole 241c formed in a circuit board 241 of the protection circuit module 140. The insertion plate 273 includes a base plate 273a and two locking wings 2731b and 2732b, which are bent from the base plate 273a, in opposing directions. Free ends 2731e and 2732e of the locking wings 2731b and 2732b contact the circuit board 241, to prevent the electrode tab 270 from deviating from the circuit board 241. Since the locking wings 2731b and 2732b are provided, the positioning of the circuit board 241 can be more flexible. Since the configurations of the remaining elements, excluding the insertion plate 273 in the electrode tab 270, are similar to those illustrated in FIG. 4, a detailed description thereof is omitted.

Although a few exemplary embodiments of the present invention have been shown and described, it would be appreciated by those skilled in the art that changes may be made in these exemplary embodiments, without departing from the principles and spirit of the invention, the scope of which is defined in the claims and their equivalents.

What is claimed is:

1. A secondary battery comprising:
a cell unit comprising a battery cell;
a module comprising a circuit board having a terminal hole; and
an electrode tab comprising an insertion plate that is inserted into the terminal hole, to electrically connect the cell unit and the circuit board, the insertion plate comprising a base plate and a locking wing, wherein the locking wing is formed as a portion cut from the base plate to form a passing hole in the base plate, wherein the passing hole is filled with solder to firmly couple the electrode tab to the circuit board.

2. The secondary battery of claim 1, wherein the locking wing is angled from the insertion plate.

3. The secondary battery of claim 1, wherein the locking wing is formed by incising and bending a portion of the insertion plate.

4. The secondary battery of claim 2, wherein the electrode tab comprises another locking wing that is angled from the insertion plate, at an opposing direction with respect to the locking wing.

5. The secondary battery of claim 1, wherein the electrode tab is made of nickel.

6. The secondary battery of claim 1, wherein:
the electrode tab further comprises a locking plate that is bent from the insertion plate at an angle;
the locking wing is disposed on a first surface of the circuit board; and
the locking plate is disposed on an opposing second surface of the circuit board.

7. The secondary battery of claim 1, wherein the electrode tab is formed by bending a single plate member.

8. The secondary battery of claim 1, the passing hole is formed by incising and bending a portion of the base plate.

9. The secondary battery of claim 1, wherein the locking wing is elastically deformed as it is inserted through the terminal hole, to prevent from deviating while being inserted into the terminal hole.

10. The secondary battery of claim 1, wherein the cell unit comprises:
a plurality of the battery cells; and
a connection plate that extends from the electrode tab and electrically connects the battery cells to each other.

11. The secondary battery of claim 10, wherein the electrode tab and the connection plate are formed by bending a single plate member.

12. The secondary battery of claim 11, wherein the connection plate comprises first and second portions that are folded to overlap each other.

13. A secondary battery comprising:
a module having terminal holes;
a plurality of battery cells;
connecting plates that extend from the battery cells toward the module, to electrically connect the battery cells; and
electrode tabs that extend from the connecting plates, through the terminal holes, to electrically connect the connecting plates to the module, the electrode tabs comprising base plates and locking wings, wherein each locking wing is formed as a portion cut from one of the base plates to form a passing hole in the base plate, wherein the locking wings lock the electrode tabs to the protection circuit module, and wherein the passing hole is filled with solder to firmly couple the electrode tab to the module.

14. The secondary battery of claim 13, wherein the electrode tabs comprise:
insertion plates that extend through the terminal holes, from which the locking wings are bent;
locking plates that are bent from the insertions plates; and
connection plates that are bent from the locking plates and are connected to the connecting plates,
wherein the locking plates extend along a first side of the protection circuit module, and the locking wings are disposed on an opposing second side of the protection circuit module.

15. The secondary battery of claim 14, wherein the insertions plates and the connection plates are bent orthogonally from opposing ends of the locking plates.

16. The secondary battery of claim 13, wherein the connecting plates comprise first portions and opposing second portions that are bent from the first portions and are connected to the electrode tabs.

17. The secondary battery of claim 13, wherein the electrode tabs each comprise two of the locking wings, which are bent in opposing directions.

* * * * *